(12) United States Patent
Shi et al.

(10) Patent No.: US 10,363,954 B2
(45) Date of Patent: Jul. 30, 2019

(54) HOUSING ASSEMBLY FOR AN ELECTRIC MOTOR

(71) Applicant: JOHNSON ELECTRIC INTERNATIONAL AG, Murten (CH)

(72) Inventors: Hai Feng Shi, Shenzhen (CN); Rui Feng Qin, Hong Kong (CN); Yan Bing Li, Shenzhen (CN); Dong Qiang Zang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 14/698,606

(22) Filed: Apr. 28, 2015

(65) Prior Publication Data

US 2015/0307123 A1 Oct. 29, 2015

(30) Foreign Application Priority Data

Apr. 28, 2014 (CN) .......................... 2014 1 0173138

(51) Int. Cl.
*H02K 1/18* (2006.01)
*B62D 5/04* (2006.01)
*H02K 1/17* (2006.01)

(52) U.S. Cl.
CPC ............. *B62D 5/0406* (2013.01); *H02K 1/17* (2013.01); *H02K 1/185* (2013.01); *H02K 1/18* (2013.01)

(58) Field of Classification Search
CPC . H02K 1/17; H02K 1/18; H02K 1/185; B62D 5/0406
USPC ................. 310/54.03–154.19, 89, 91, 154.21
See application file for complete search history.

(56) References Cited

U.S. PATENT DOCUMENTS

| | | | | |
|---|---|---|---|---|
| 3,887,826 A | * | 6/1975 | Apostoleris | H02K 1/17 310/154.07 |
| 3,988,623 A | * | 10/1976 | Yamaguchi | H02K 1/17 310/154.15 |
| 4,707,630 A | * | 11/1987 | Tomite | H02K 1/17 310/154.12 |
| 4,745,319 A | * | 5/1988 | Tomite | H02K 1/17 310/154.15 |
| 5,105,114 A | * | 4/1992 | Sickle | H02K 1/17 310/154.13 |

(Continued)

FOREIGN PATENT DOCUMENTS

| | | |
|---|---|---|
| JP | S6110950 A | 1/1986 |
| JP | S63220749 A | 9/1988 |

(Continued)

OTHER PUBLICATIONS

Translation of JP 2001-197690 from JPO.*
JPS6110950 English Translation.*

*Primary Examiner* — Bernard Rojas
*Assistant Examiner* — Maged M Almawri
(74) *Attorney, Agent, or Firm* — Muncy, Geissler, Olds & Lowe, P.C.

(57) ABSTRACT

A housing assembly has a housing having an open end. A plurality of magnets are fixed to an inner surface of the housing. A magnet holder supports the magnets against movement in the axial and circumferential directions. A cover is mounted in the magnet holder for fixing the magnets in the radial direction. The cover is resiliently deformed when assembled to the magnet holder and magnets, and abuts and resiliently urges the magnets towards the inner surface of the housing.

16 Claims, 13 Drawing Sheets

(56) References Cited

U.S. PATENT DOCUMENTS

| | | | | |
|---|---|---|---|---|
| 5,723,929 | A | * | 3/1998 | Niimi ........................ H02K 1/17 310/152 |
| 8,058,760 | B2 | * | 11/2011 | Hirabayashi ........... H02K 1/185 310/154.03 |
| 2004/0113504 | A1 | * | 6/2004 | Agnes ....................... H02K 1/17 310/154.08 |
| 2006/0145554 | A1 | * | 7/2006 | Wehrle ..................... H02K 1/17 310/154.12 |
| 2010/0156226 | A1 | * | 6/2010 | Islam ..................... H02K 23/04 310/154.21 |
| 2013/0093277 | A1 | * | 4/2013 | Onishi ..................... H02K 1/17 310/154.13 |

FOREIGN PATENT DOCUMENTS

| | | | |
|---|---|---|---|
| JP | H11122888 A | | 4/1999 |
| JP | 2001-197690 | * | 7/2001 |
| JP | 2001197690 A | | 7/2001 |
| JP | 2004282951 A | | 10/2004 |

* cited by examiner

HOUSING ASSEMBLY FOR AN ELECTRIC MOTOR

CROSS REFERENCE TO RELATED APPLICATIONS

This non-provisional patent application claims priority under 35 U.S.C. § 119(a) from Patent Application No. 201410173138.1 filed in The People's Republic of China on Apr. 28, 2014, the entire contents of which are hereby incorporated by reference.

FIELD OF THE INVENTION

This invention relates to a permanent magnet direct current (PMDC) motor and in particular to a stator assembly of a PMDC motor.

BACKGROUND OF THE INVENTION

A PMDC motor typically includes a stator and a rotor rotatably mounted to the stator. The stator includes a housing and a plurality of magnets fixed to an inner surface of the housing by glue. This type of PMDC motor works well when the power or torque requirement is not high. However, in some application fields requiring high power or torque, such as in electric power steering of a vehicle, the magnets of the motor are liable to separate from the housing, either in whole or in part, under the interaction of the forces between the stator and the rotor.

SUMMARY OF THE INVENTION

Thus, there is a desire for a PMDC motor having an improved stator assembly with reliably mounted magnets.

Accordingly, in one aspect thereof, the present invention provides a housing assembly comprising: a housing having an open end; a plurality of magnets located at an inner surface of the housing; a magnet holder supporting the magnets; and a cover mounted in the magnet holder for fixing the magnets, wherein the cover is resiliently deformed when assembled to the magnet holder and magnets, and abuts and resiliently urges the magnets towards the inner surface of the housing.

Preferably, the magnet holder comprises a first bracket and a second bracket, and a plurality of pillars connecting the first bracket to the second bracket, each of the magnets is fixed in a space defined by the first bracket, the second bracket and two adjacent pillars.

Preferably, each two adjacent pillars forms a pair of contact surfaces facing each other and respectively located at two circumferential sides of the magnet fixed between the two adjacent pillars, and each pair of contact surfaces has at least one rib.

Preferably, each rib extends from a radially inner edge to a radially outer edge of the corresponding contact surface.

Preferably, each rib extends in a plane orthogonal to an axis of the housing.

Preferably, each rib has a bowl shaped cross section.

Preferably, each rib has a surface remote from the contact surface, and the surface is substantially parallel to a side of the magnet after the magnet is assembled to the magnet holder.

Preferably, each two adjacent pillars forms a pair of contact surfaces facing each other and respectively located at two circumferential sides of the magnet fixed between the two adjacent pillars, and the contact surfaces of the pair of contact surfaces are parallel with each other.

Preferably, the magnet has two parallel sides matching the pair of contact surfaces.

Preferably, the cover is made of nonmagnetic material with good elasticity, such as stainless steel.

Preferably, the cover is in the form of a sheet metal roll before being assembled, having an outer radius greater than a distance between a radially inner surface of the magnet to an axis of the housing.

Preferably, the cover is in the form of a sheet metal roll before being assembled, having an outer radius greater than a first distance between a radially inner surface of the magnet and an axis of the housing, but smaller than a second distance between a radially innermost portion of the pillar of the magnet holder and the axis of the housing.

Preferably, the magnet holder is an injection molded plastic part.

Preferably, the first bracket has an edge forming a stop to axially position the cover with respect to the magnet holder.

Preferably, each pillar has a cross section that is substantially isosceles trapezoid shaped.

According to a second aspect, the present invention provides a PMDC motor comprising: a stator comprising the housing assembly of the first aspect, and a brush assembly and an end cap mounted to the open end of the housing assembly; and a rotor rotatably received in the housing assembly.

According to a third aspect, the present invention provides an electric power steering assembly, comprising: a steering device; a control module; and the motor of the second aspect, connected to the steering device and the control module, for driving the steering device in response to commands from the control module.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
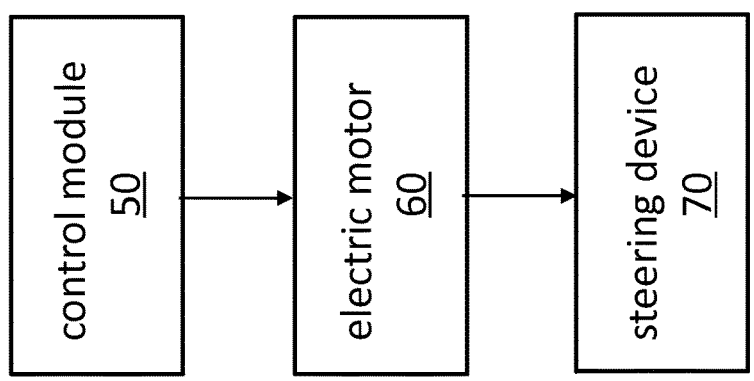
FIG. 1 is a block diagram illustrating an electric power steering assembly.

FIG. 1 is a block diagram illustrating an electric power steering assembly for a vehicle. The electric power steering assembly comprises a control module 50, an electric motor 60 and a steering device 70. The electric motor 60 is connected between the control module 50 and the steering device 70, driving the steering device 70 according to commands from the control module 50, to reduce the force needed by an operator (driver of the vehicle) to steer the vehicle.

Figure 2:
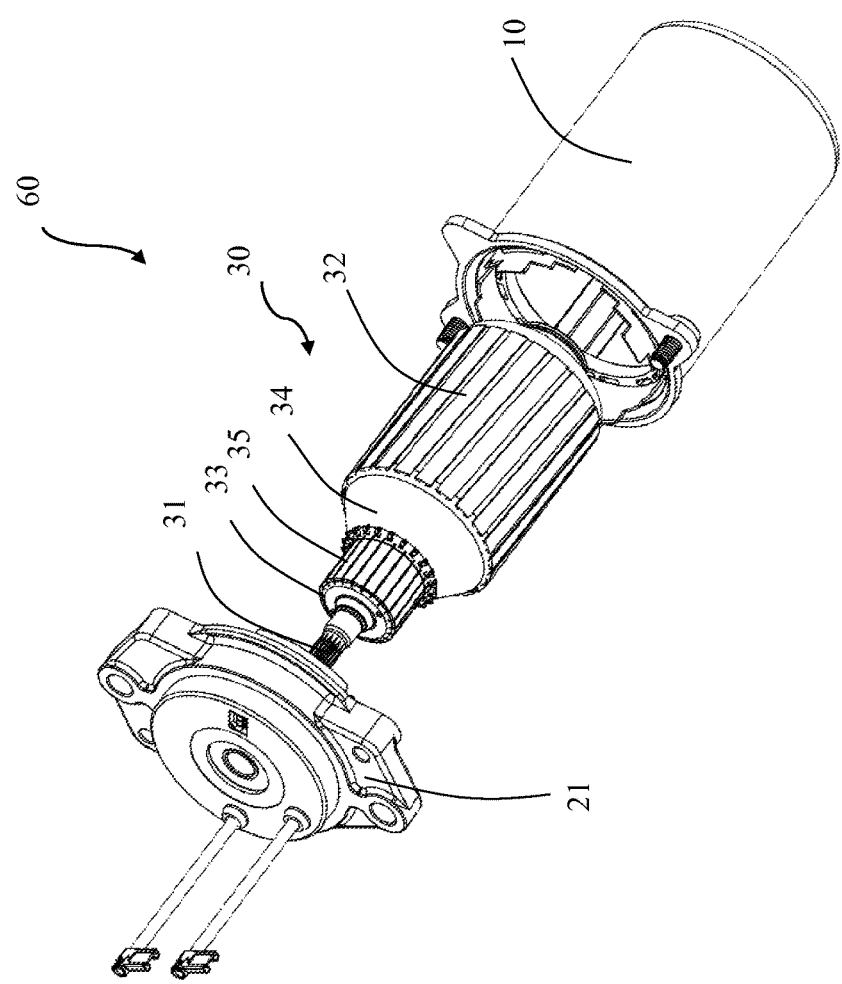
FIG. 2 is an exploded view of a PMDC motor according to the preferred embodiment of the present invention, for the electric power steering assembly of FIG. 1.
Figure 3:
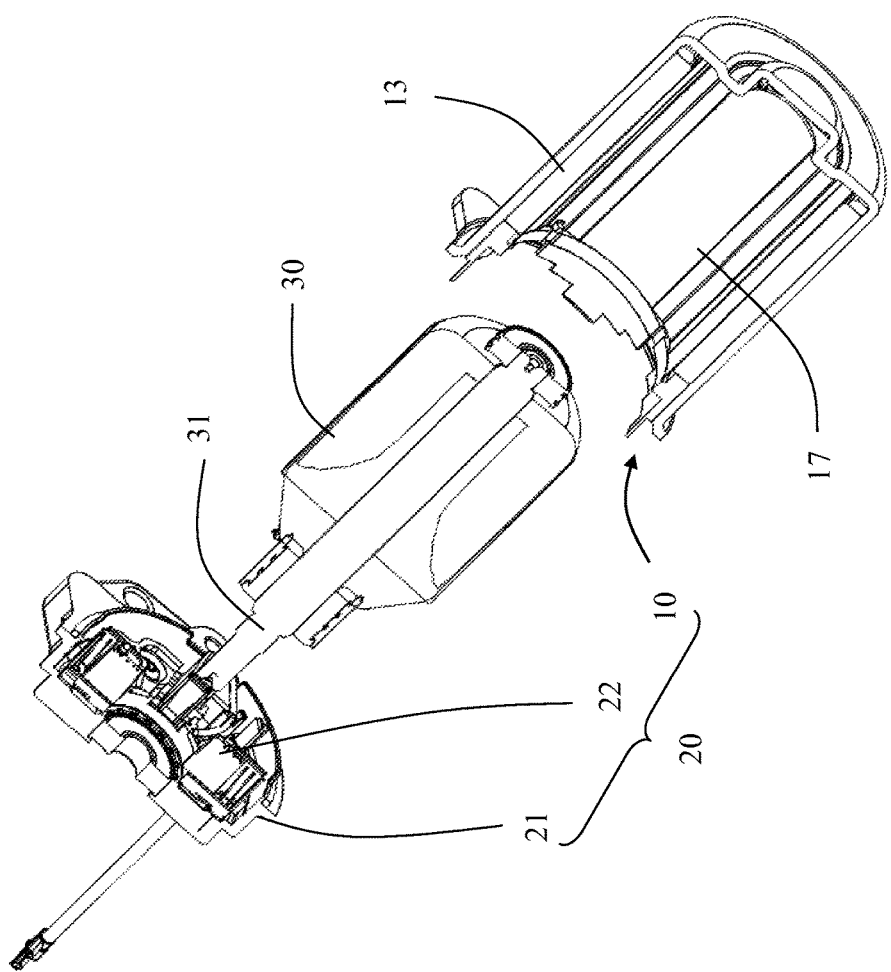
FIG. 3 is a sectional view of the motor of FIG. 2.
Figure 4:
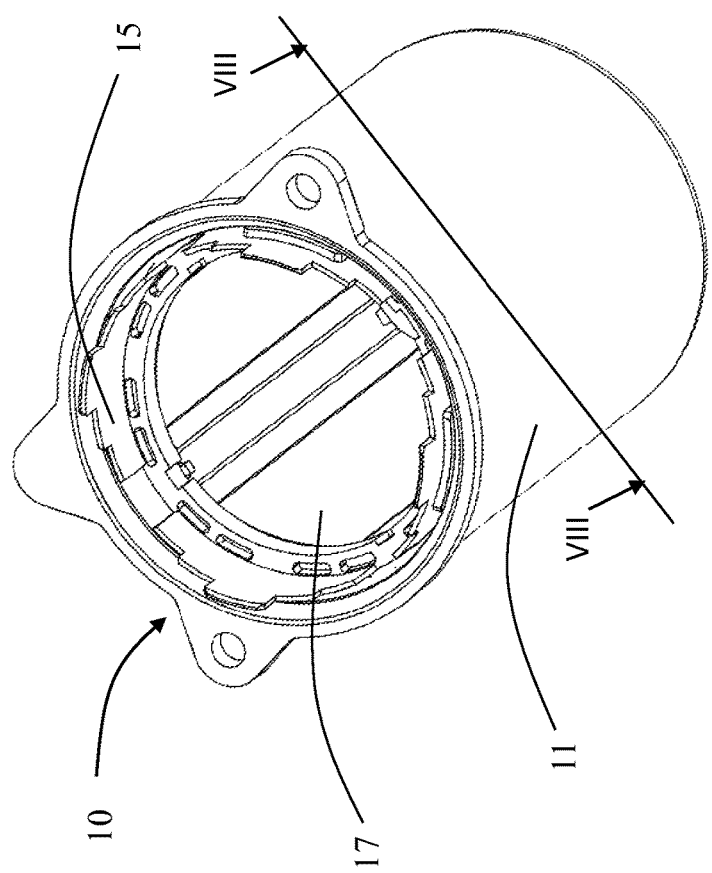
FIG. 4 illustrates a housing assembly of the motor of FIG. 2.

Referring to FIGS. 2 and 3, the electric motor 60 is a PMDC motor, having a stator 20 and a rotor 30 rotatably mounted to the stator 20. The rotor 30 includes a shaft 31, and a rotor core 32 and a commutator 33 fixed on the shaft 31. The commutator 33 has a plurality of segments 35. Windings 34 are wound on the rotor core 32 and connected to the segments 35 of the commutator 33.

The stator 20 includes a housing assembly 10 having a closed end and an open end. An end cap 21 and a brush assembly 22 are mounted to the open end of the housing assembly 10. The rotor core 32 is received in the housing assembly 10, concentric with the housing assembly 10.

Referring to FIGS. 4 through 13, the housing assembly 10 includes a housing 11, a plurality of magnets 13 located at an inner surface of the housing 11, a magnet holder 15 to support the magnets 13, and a resilient cover 17 for resiliently urging the magnets 13 towards the inner surface of the housing 11. The housing 11 has a tubular shape. In this embodiment, the housing 11 has a circular bottom 12 and a cylindrical sidewall 14 extending from a periphery of the bottom. The magnet 13 has an arc shape adapted to the arc inner periphery of the housing 11. The magnets 13 are held to the inner periphery of the housing 11 by the magnet holder 15 and the resilient cover 17.

The magnet holder 15 has a first bracket 151 and a second bracket 153 arranged parallel to each other, and a plurality of pillars 155 connecting the first bracket 151 to the second bracket 153. Each of the pillars 155 has two axial ends respectively connected to the first bracket 151 and the second bracket 153. A receiving space for receiving a magnet 13 is defined between the first bracket 151, the second bracket 153, and two adjacent pillars 155. In this embodiment, the pillars 155 extend axially and are parallel with each other.

Each of the magnets 13 is received in a respective receiving space of the magnet holder 15, with a radially outer surface abutting the inner surface of the housing 11. A radially inner surface of the magnet 13 is located closer to the rotational axis O of the rotor 30 than a radially innermost portion of the pillar 155 of the magnet holder 15. That is, a distance D1 measured between the radially inner surface of the magnet 13 and the axis O of the rotor 30 is smaller than a distance D2 measured between the radially innermost portion of the pillar 155 of the magnet holder 15 and the axis O of the rotor 30.

As such, magnets 13 are able to move in a radially inwards direction. The cover 17 is arranged in the magnet holder 15, abutting the radially inner surface of the magnets 13 to urge the magnets 13 radially outwardly, towards sidewall 14 of the housing, such that the magnets 13 are stably attached onto the inner surface of the housing 11 without movement.

Figure 5:
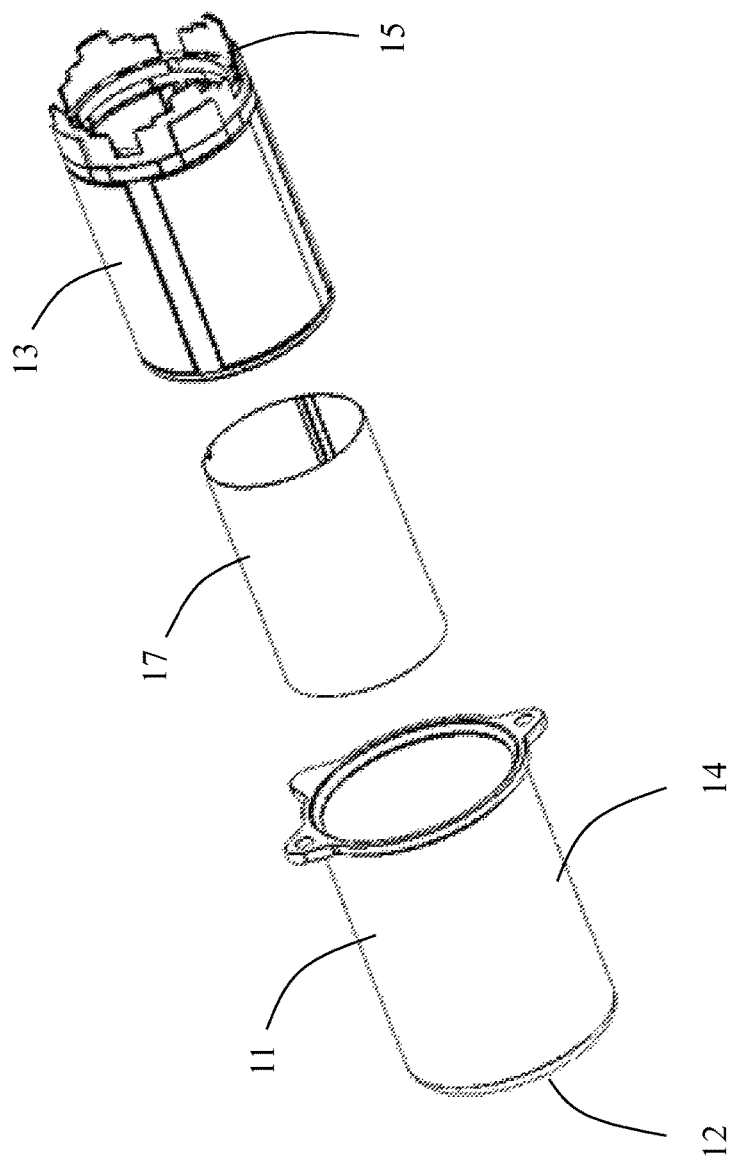
FIG. 5 is an exploded view of the housing assembly of FIG. 4.
Figure 6:
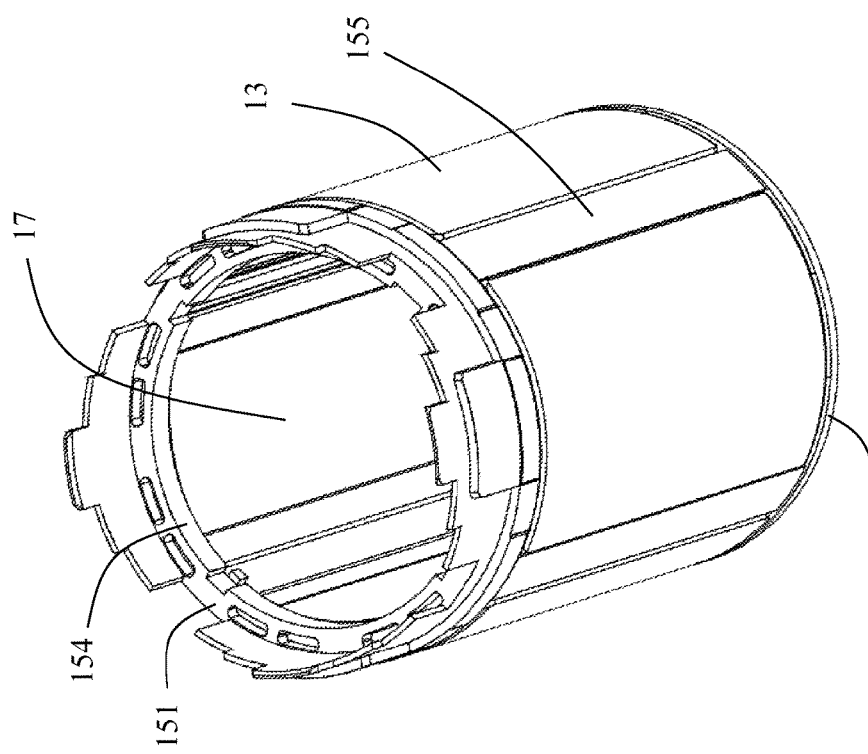
FIG. 6 illustrates a magnet assembly, being a part of the housing assembly of FIG. 4.
Figure 7:
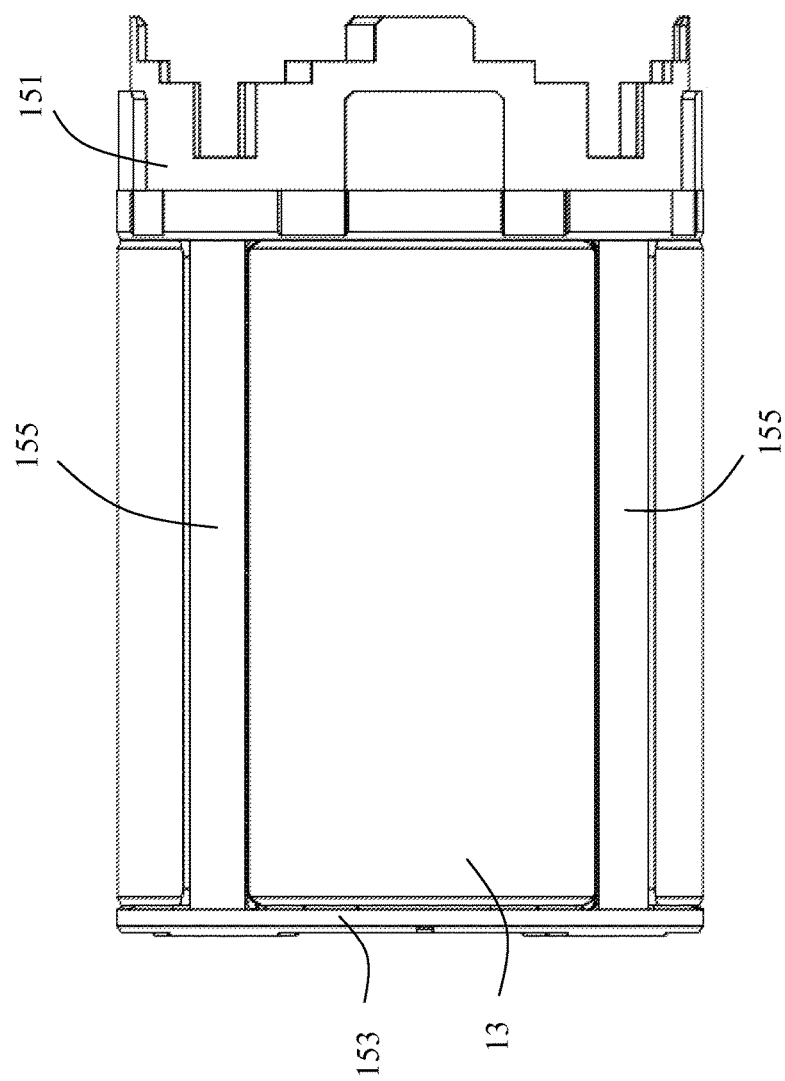
FIG. 7 is a side view of the magnet assembly of FIG. 6.
Figure 8:
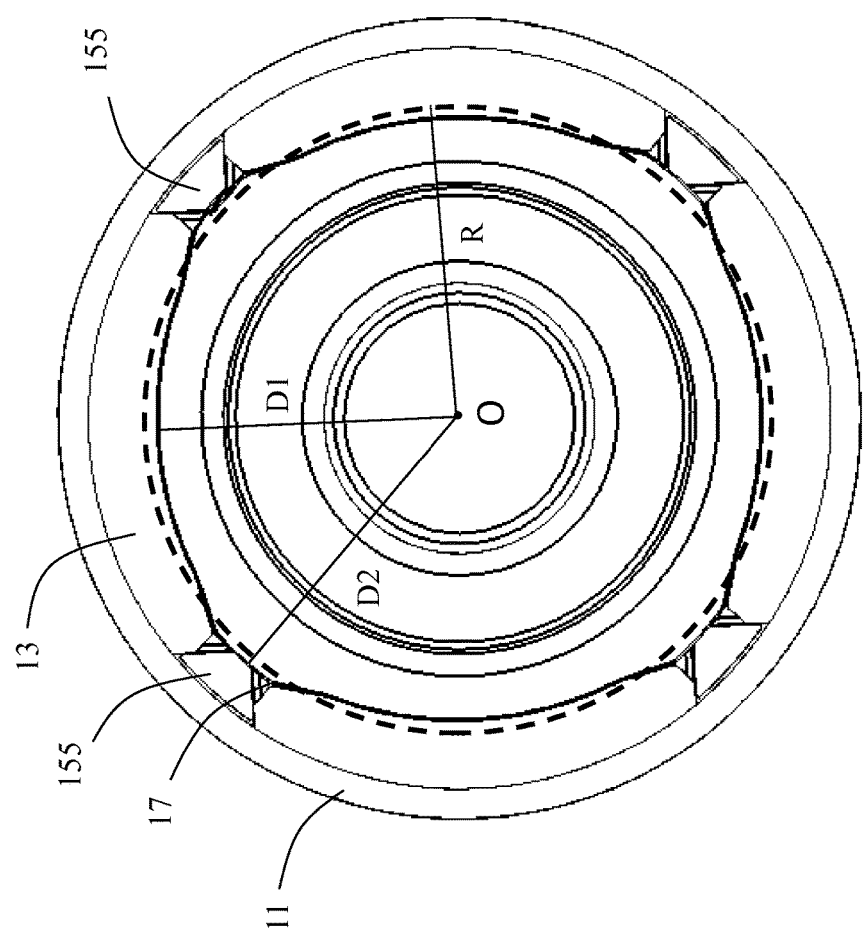
FIG. 8 is a cross section of the housing assembly of FIG. 4.

As shown in FIG. 5 and FIG. 8, the cover 17 is substantially cylindrical before being assembled to the magnet holder 15, but is deformed after being assembled. In FIG. 8, the dashed line illustrates the unassembled cover 17. The unassembled cover 17 has an outer radius R greater than the distance D1, but smaller than the distance D2. As such, the cover 17 is resiliently deformed when it is assembled to the magnet holder 15 to fit within the space defined by the magnets 13. Therefore, portions of the cover 17 corresponding to the magnets 13 are resiliently deformed radially inwardly, and other portions of the resilient cover 17 protrude outwardly between the magnets. The difference between the distance D2 and radius R of the resilient cover 17 provides space for the other portions of the resilient cover 17 to protrude into. The deformed cover 17 abuts and urges the magnets 13 radially outwardly. As a result, the magnets 13 are firmly sandwiched between the housing 11 and the cover 17 and prevented from moving radially.

During assembly, the cover 17 is inserted into the magnet holder 15 from a bottom end, for example, from the second bracket 153. The cover 17 is resiliently deformed during insertion according to the size of the magnet holder 15 and the magnets 13, such that a radial force is applied directly to the magnets 13 and then to the housing 11 by the resilient deformation of the cover 17. Correspondingly, a counterforce from the housing 11 acting on the magnets 13 and then the cover 17 is produced, which fixes the position of the cover 17 and prevents the cover 17 from moving. Preferably, the first bracket 151 forms an edge 154 to stop one axial end of the cover 17, to define the axial position of the cover.

Preferably, the cover 17 is made of nonmagnetic material with good elasticity, such as stainless steel. Preferably, the cover 17 is a sheet metal roll. Optionally, the cover 17 has a radial thickness in a range of 0.1 mm to 0.15 mm.

Figure 9:
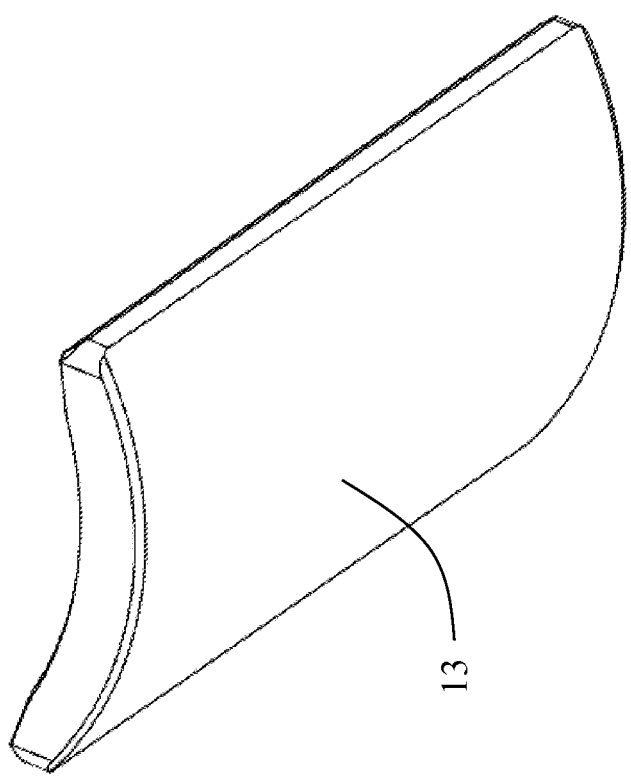
FIG. 9 shows a magnet of the magnet assembly of FIG. 6.

Referring to FIGS. 8 and 9, in this embodiment, the radially inner surface of the magnets 13 extend radially outwardly from a circumferential central portion to two circumferential sides. Therefore, a distance between the inner surface of the magnet 13 and the axis O of the rotor 30 gradually increases from the circumferential central portion to two circumferential sides, gradually approaching the distance D2 towards the pillar 155. That is, each magnet is thicker at the center than at the circumferential sides. Such shape of the magnet 13 facilitates resilient deformation of the cover 17, and increases contact surface between the cover 17 and the magnets 13. As a result, the magnets 13 can be firmly fixed onto the inner periphery of the housing 11.

Figure 10:
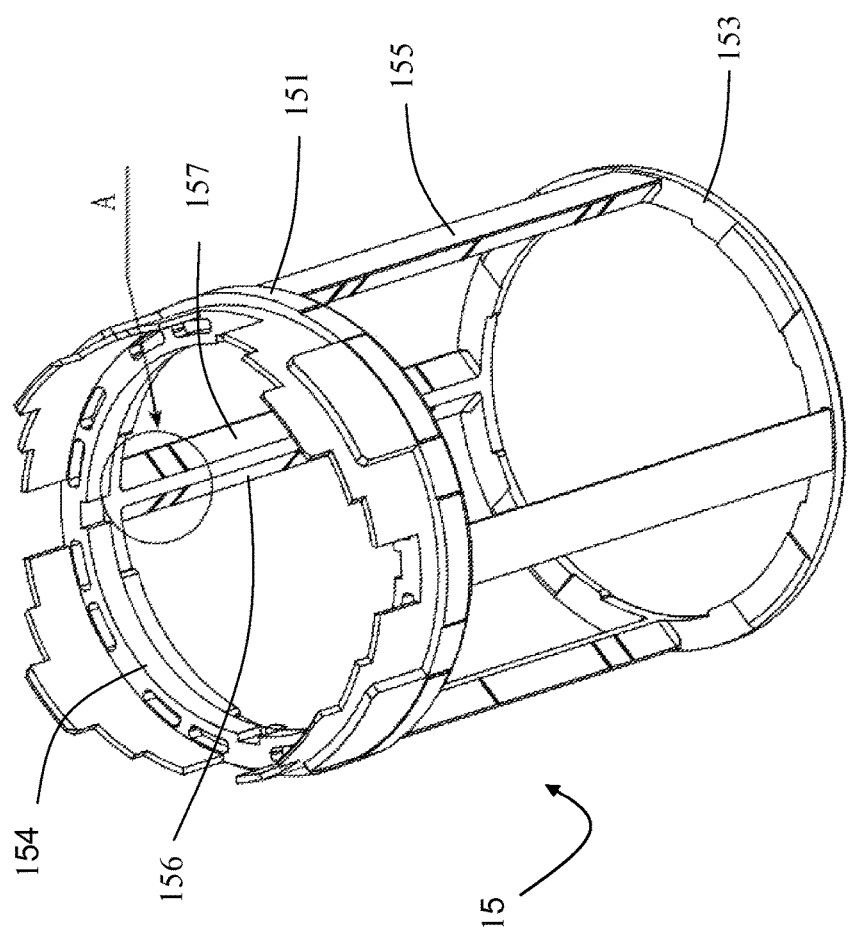
FIG. 10 shows a magnet holder of the magnet assembly of FIG. 6.
Figure 11:
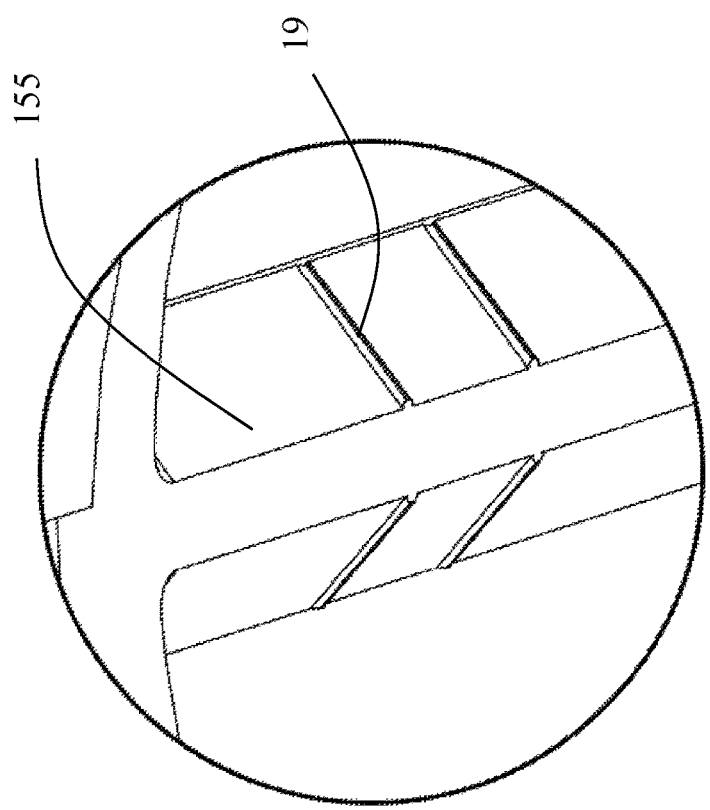
FIG. 11 is an enlarged view of circled portion A of FIG. 10.

Referring to FIGS. 10 to 11, preferably, the magnet holder 15 is made by injection molding engineering plastic. Each pillar 155 has two contact surfaces 156, 157. One contact surface 156 of one pillar 155 and one contact surface 157 of an adjacent pillar 155 forms a pair of contact surfaces facing each other to fix a magnet 13 there between. The contact surfaces 156, 157 of the pair of contact surfaces are parallel with each other, or at least portions of the pair of contact surfaces 156, 157 are parallel with each other. This allows the magnets 13 to have two parallel sides to match the contact surfaces 156, 157 of the pillars 155. Magnets having two parallel sides are easier to assembly since the magnet can be conveniently and firmly clasped by a tool at the two parallel sides, and the manufacturing accuracy of the magnet 13 is ensured. Also, the magnet 13 and the pillars 155 contact each other by surface contact, increasing the positioning accuracy of the magnet 13.

Preferably, each contact surface 156, 157 has a plurality of tiny ribs 19 to complement tolerance between the magnet holder 15 and the magnets 13. Each rib 19 extends from a radially inner edge to a radially outer edge of the contact surface 156, 157. In this embodiment, the ribs 19 extend in planes orthogonal to the axis O of the rotor 30. As the magnet holder 15 is made of plastic, the tiny ribs 19 may be deformed or cut by the magnets 13 during assembly, absorbing the tolerance between the magnet holder 15 and the magnets 13, thereby firmly positioning the magnets 13 onto the magnet holder 15.

Figure 12:
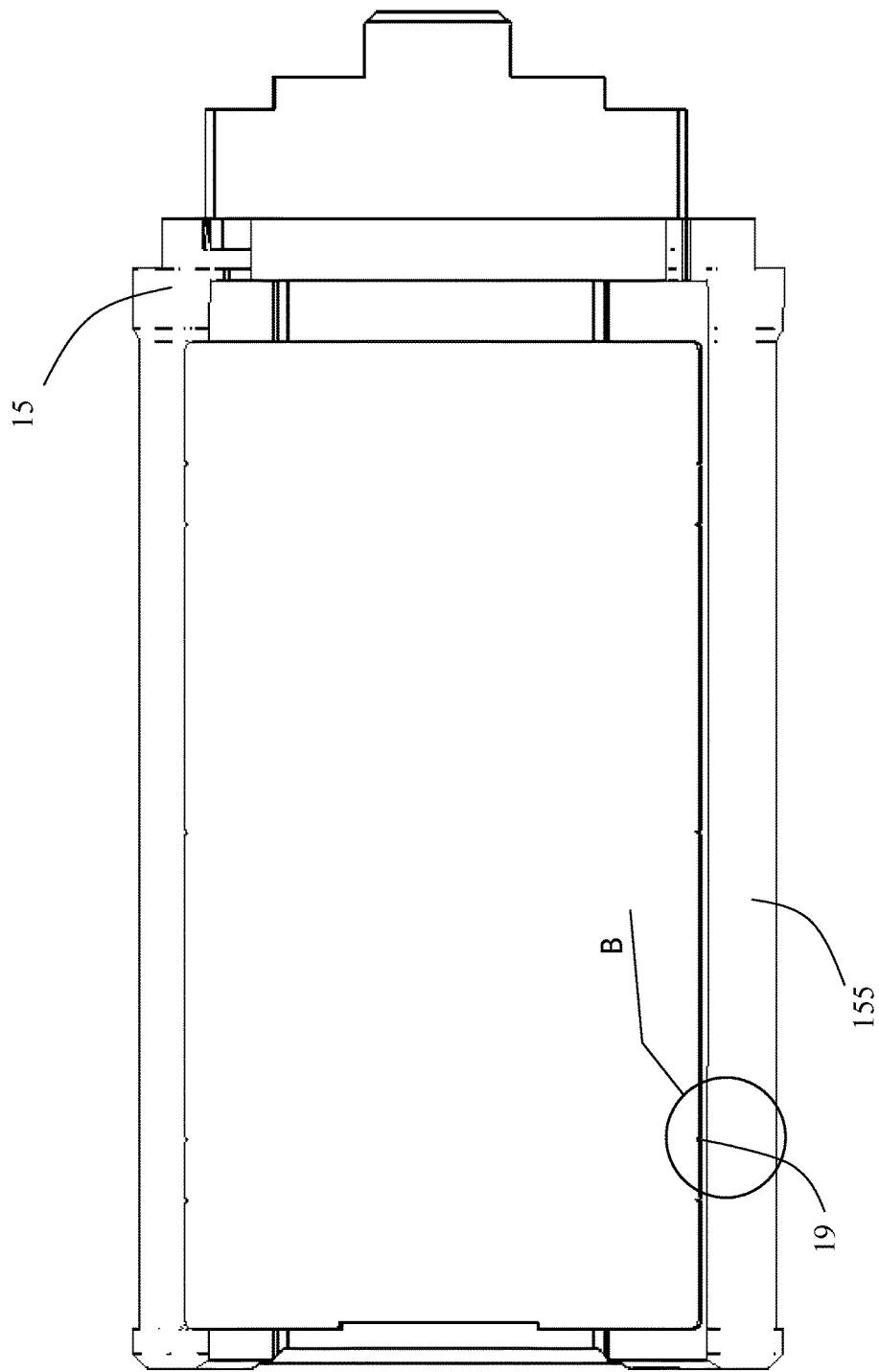
FIG. 12 is a sectional view of the magnet holder of FIG. 10.
Figure 13:
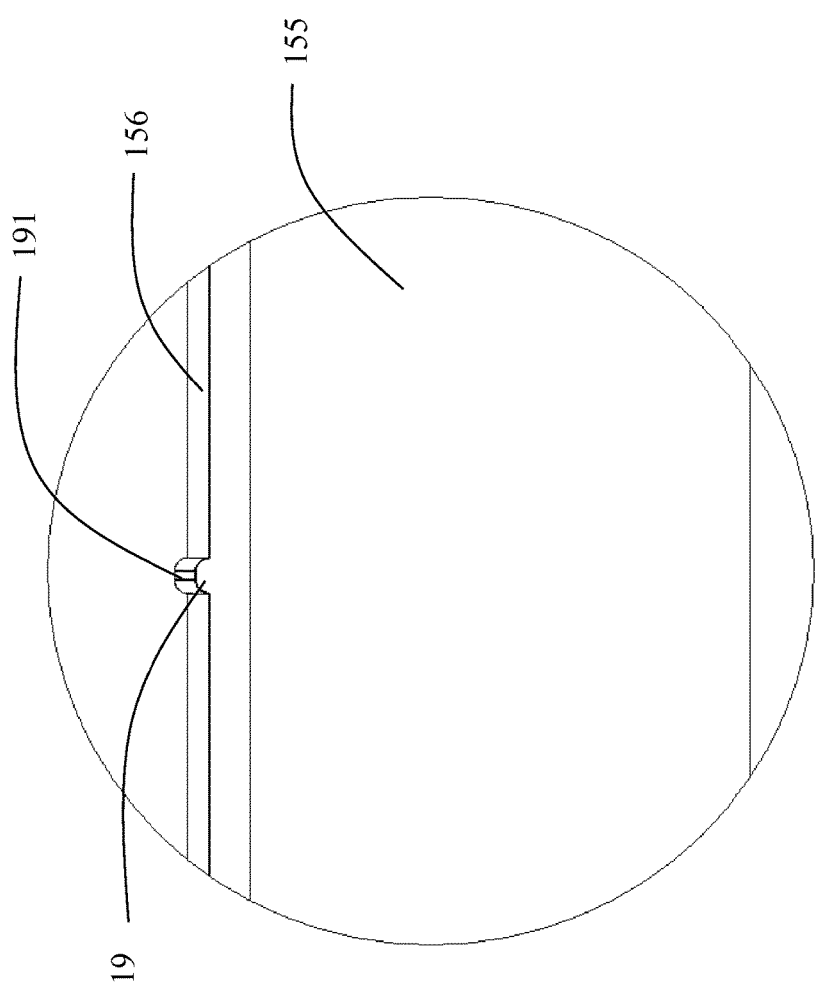
FIG. 13 is an enlarged view of circled portion B of FIG. 12.

Referring to FIGS. 12 and 13, preferably, the rib 19 has a bowl shaped cross section. The rib 19 has a surface 191 remote from the contact surface of the pillar 155. Preferably, the remote surface 191 is flat and substantially parallel with the side of the magnet 13 after the magnet 13 is assembled to the magnet holder 15, such that the rib 19 makes a surface contact with the side of the magnet 13. Therefore, the magnet 13 is accurately positioned by the magnet holder 15. The magnet holder fixedly positions the magnets circumferentially and axially within the housing, against the inner surface of the sidewall of the housing.

In this embodiment, the pillar 155 of the magnet holder 15 has a cross section substantially isosceles trapezoid shaped. Alternatively, the cross section of the pillar 155 may have triangle shape, rectangular shape, or other shapes.

It should be noted that although the electric motor of the present invention has been described in relation to use in an electric power steering application as an example, it can be used in other applications.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A housing assembly comprising:
a housing having an open end;
a plurality of magnets located at an inner surface of the housing, each of the plurality of magnets having a radial thickness that is greater in a circumferential middle than at either circumferential end;
a magnet holder supporting the magnets, wherein the magnet holder has a plurality of arranged pillars, which are non-magnetic and spaced from each other, and extend in an axial direction of the housing, opposite circumferential ends of each of the magnets respectively directly abut against adjacent pillars; and
a cover mounted in the magnet holder for fixing the magnets,
wherein the cover is in the form of a sheet metal roll before being assembled, having an outer radius greater than a first distance between a radially inner surface of the magnet and an axis of the housing, but smaller than a second distance between a radially innermost portion of the pillar of the magnet holder and the axis of the housing; the cover is resiliently deformed when assembled to the magnet holder and magnets, and forms a plurality of first deformed portions respectively abutting against the radially inner surfaces of the magnets to resiliently urge the magnets towards the inner surface of the housing, and a plurality of second deformed portions protruding outwardly between the magnets and abutting against the radially innermost portions of the pillars.

2. The housing assembly of claim 1, wherein the cover is made of nonmagnetic material with good elasticity.

3. The housing assembly of claim 2, wherein the cover is made of stainless steel.

4. A PMDC motor comprising:
a stator comprising the housing assembly of claim 1, and a brush assembly and an end cap mounted to the open end of the housing assembly; and
a rotor rotatably received in the housing assembly.

5. An electric power steering assembly, comprising:
a steering device;
a control module; and
the motor of claim 4, connected to the steering device and the control module, for driving the steering device in response to commands from the control module.

6. The housing assembly of claim 1, wherein the magnet holder further comprises a first bracket and a second bracket, the pillars connecting the first bracket to the second bracket, each of the magnets is fixed in a space defined by the first bracket, the second bracket and two adjacent pillars.

7. The housing assembly of claim 6, wherein the magnet holder is an injection molded plastic part.

8. The housing assembly of claim 6, wherein each pillar has a cross section that is substantially isosceles trapezoid shaped.

9. The housing assembly of claim 6, wherein the first bracket has an edge forming a stop to axially position the cover with respect to the magnet holder.

10. The housing assembly of claim 6, wherein each two adjacent pillars forms a pair of contact surfaces facing each other and respectively located at two circumferential sides of the magnet fixed between the two adjacent pillars, and the contact surfaces of the pair of contact surfaces are parallel with each other.

11. The housing assembly of claim 10, wherein said magnet has two parallel sides matching the pair of contact surfaces.

12. The housing assembly of claim 6, wherein each two adjacent pillars forms a pair of contact surfaces facing each other and respectively located at two circumferential sides of the magnet fixed between the two adjacent pillars, and each pair of contact surfaces has at least one rib.

13. The housing assembly of claim 12, wherein each rib extends from a radially inner edge to a radially outer edge of the corresponding contact surface.

14. The housing assembly of claim 12, wherein each rib extends in a plane orthogonal to an axis of the housing.

15. The housing assembly of claim 12, wherein each rib has a bowl shaped cross section.

16. The housing assembly of claim 12, wherein each rib has a surface remote from the contact surface, and the surface is substantially parallel to a side of the magnet after the magnet is assembled to the magnet holder.

* * * * *